(12) United States Patent
Schlansker et al.

(10) Patent No.: US 7,650,471 B2
(45) Date of Patent: Jan. 19, 2010

(54) HEAD OF QUEUE CACHE FOR COMMUNICATION INTERFACES

(75) Inventors: Michael Steven Schlansker, Los Altos, CA (US); Erwin Oertli, Mountain View, CA (US); Jean-Francois Collard, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 549 days.

(21) Appl. No.: 11/326,919

(22) Filed: Jan. 6, 2006

(65) Prior Publication Data

US 2007/0162701 A1 Jul. 12, 2007

(51) Int. Cl.
*G06F 12/10* (2006.01)
(52) U.S. Cl. .................... 711/154; 711/118; 711/133; 710/39; 710/54; 370/412

(58) Field of Classification Search ................. 709/250; 711/154, 118, 133
See application file for complete search history.

(56) References Cited

U.S. PATENT DOCUMENTS

2003/0144868 A1* 7/2003 MacIntyre et al. .............. 705/1
2005/0177657 A1* 8/2005 Pope et al. .................... 710/36
2006/0248234 A1* 11/2006 Pope et al. .................. 709/250

* cited by examiner

*Primary Examiner*—Hetul Patel

(57) ABSTRACT

A technique includes identifying an address of a head end of a queue and monitoring a coherent interconnect to identify a data transfer that is communicated by a producer, which targets the address. The technique includes storing the data of the data transfer in the queue and selectively storing at least a portion of the data in a head-of-queue cache memory based at least in part on whether the monitoring identifies the address. At least a portion of the data is selectively retrieved from the head-of-queue cache memory instead of from the queue for transmission to a consumer.

20 Claims, 5 Drawing Sheets

HEAD OF QUEUE CACHE FOR COMMUNICATION INTERFACES

BACKGROUND

The present invention relates generally to data communication systems and methods and, more particularly, to data communication systems and methods in which a number of virtual network interfaces efficiently share hardware resources in, for example, Ethernet-based, scalable and tightly coupled systems.

Ethernet's broad use continues to stimulate dramatic increases in performance and decreases in cost for components commonly used in commercial applications. Many of today's commercial applications tolerate the relatively high latency associated with Ethernet-based systems, however emerging commercial applications, such as multithreaded databases and file systems, will likely require reduced latency. Some specialized network solutions provide reduced latency, but are more expensive than Ethernet-based scalable clusters.

One area in which latency performance can be improved is in the network interface controller (NIC). A NIC is a hardware device that supports communication with a network. As context, consider the exemplary system of FIG. 1. Therein a symmetric multiprocessor (SMP) system 10 includes a number of central processor units (CPUs) 12 which share memory unit 14 via coherence fabric 16. Although SMP 10 is shown as having four processor cores, those skilled in the art will appreciate that SMP 10 can have more or fewer CPUs. SMP 10 sends messages to other SMPs 20 under the control of NIC 18 via Ethernet connections and a fabric (switch) 22. The NIC 18 will typically have a processor (not shown) associated therewith, either as an integral part of the NIC or in the form of a helper processor, so that the NIC has sufficient intelligence to interpret various commands. The fabric 21 will route messages to their intended recipients, although occasionally messages will be dropped such that the system illustrated in FIG. 1 needs to support retransmission of dropped messages.

Although there is only one hardware NIC 18 per SMP 10, 20, many different software programs may be running simultaneously on a given SMP and may have messages to transmit across the system via fabric 22. Thus the NIC 18 needs to be implemented as a shared resource. One approach for sharing the NIC 18 is to require that, as part of the message transmission process, the various software programs call a complex operating system driver to coordinate shared access to the NIC 18. However, this shared access mechanism leads to high software overhead as a time consuming operating system call is required for frequently executed communication operations.

Another approach for sharing the NIC 18 employs virtual network interface controllers (VNICs) to provide a distinct interface for each of the multiple programs that share that NIC. A VNIC is a user-level software interface that is used, by a program, to communicate directly with a NIC. A VNIC can be implemented within a special region of a user's memory space where actions, such as the reading and writing of data, are used to direct the NIC to carry out communication operations. A special communication library can be provided to translate higher level communication operations, such as sending a message, into appropriate lower-level actions used to control the NIC.

As shown in FIG. 2, since a number of VNICs 22 operate to share one NIC 18, a priority mechanism 24 is used to determine which VNIC shall receive service from a NIC among a set of competing service requests. However, to further reduce latency, once a VNIC 22 is selected for service by the NIC 18, it would be desirable to obtain a message from the selected VNIC as rapidly as possible.

Traditionally, doorbell interfaces have been used to signal the need to service a separate data queue. However the signaling function associated with doorbell interfaces was separate from the data queue and, therefore, could not be used to also assist in expediting data transfer. Accordingly, it would be desirable to provide methods and systems for communicating data which overcome these drawbacks and limitations.

SUMMARY

According to one exemplary embodiment of the present invention a method for communicating data between a producer and a consumer includes the steps of: storing data to be communicated from the producer in a queue, storing a portion of the data disposed at a head end of said queue in a head-of-queue cache memory, and retrieving the data from the head-of-queue cache memory for transmission to the consumer.

According to another exemplary embodiment of the present invention, a system for communicating data includes a first device which is a producer of data, a second device which is a consumer of the data, a queue for storing the data to be transmitted from the producer to the consumer, and a head-of-queue cache memory for caching data disposed at a head end of the queue.

BRIEF DESCRIPTION OF THE DRAWINGS

The accompanying drawings, which are incorporated in and constitute a part of the specification, illustrate an embodiment of the invention and, together with the description, explain the invention. In the drawings.

DETAILED DESCRIPTION

Figure 1:
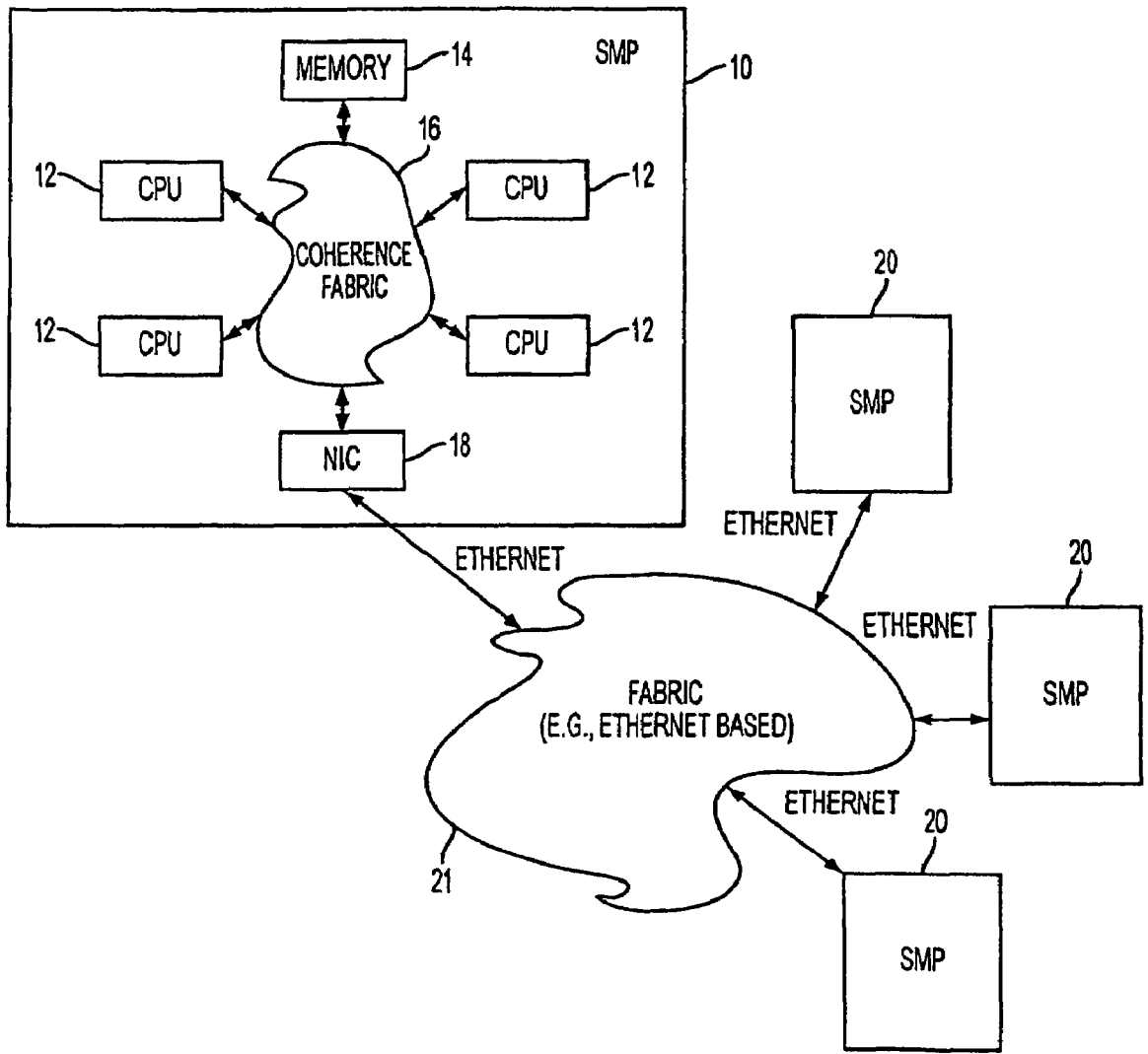
FIG. 1 illustrates an exemplary system in which exemplary embodiments of the present invention can be implemented.

The following description of the exemplary embodiments of the present invention refers to the accompanying drawings. The same reference numbers in different drawings identify the same or similar elements. The following detailed description does not limit the invention. Instead, the scope of the invention is defined by the appended claims. In addition to other figures, reference is also made below to FIGS. 1 and 2 and elements described above.

According to exemplary embodiments of the present invention, a head-of-queue cache mechanism provides an efficient communication interface between, for example, communication software running on a general processor (e.g., CPUs 12 in FIG. 1) and a specialized communication processor associated with NIC 18 or, more generally, between a producer of data and a consumer of data. Among other things, head-of-queue cache mechanisms according to exemplary embodiments of the present invention support multiple VNICs to enable each VNIC to be used independently by separate software tasks. Additionally, head-of-queue cache mechanisms enable efficient data transport by expediting the recognition and movement of messages which are next in line to be transmitted by the system. Although a detailed example is provided in the context of a networked system, head-of-queue cache mechanisms according to the present invention can also be used in non-networked systems.

Figure 2:
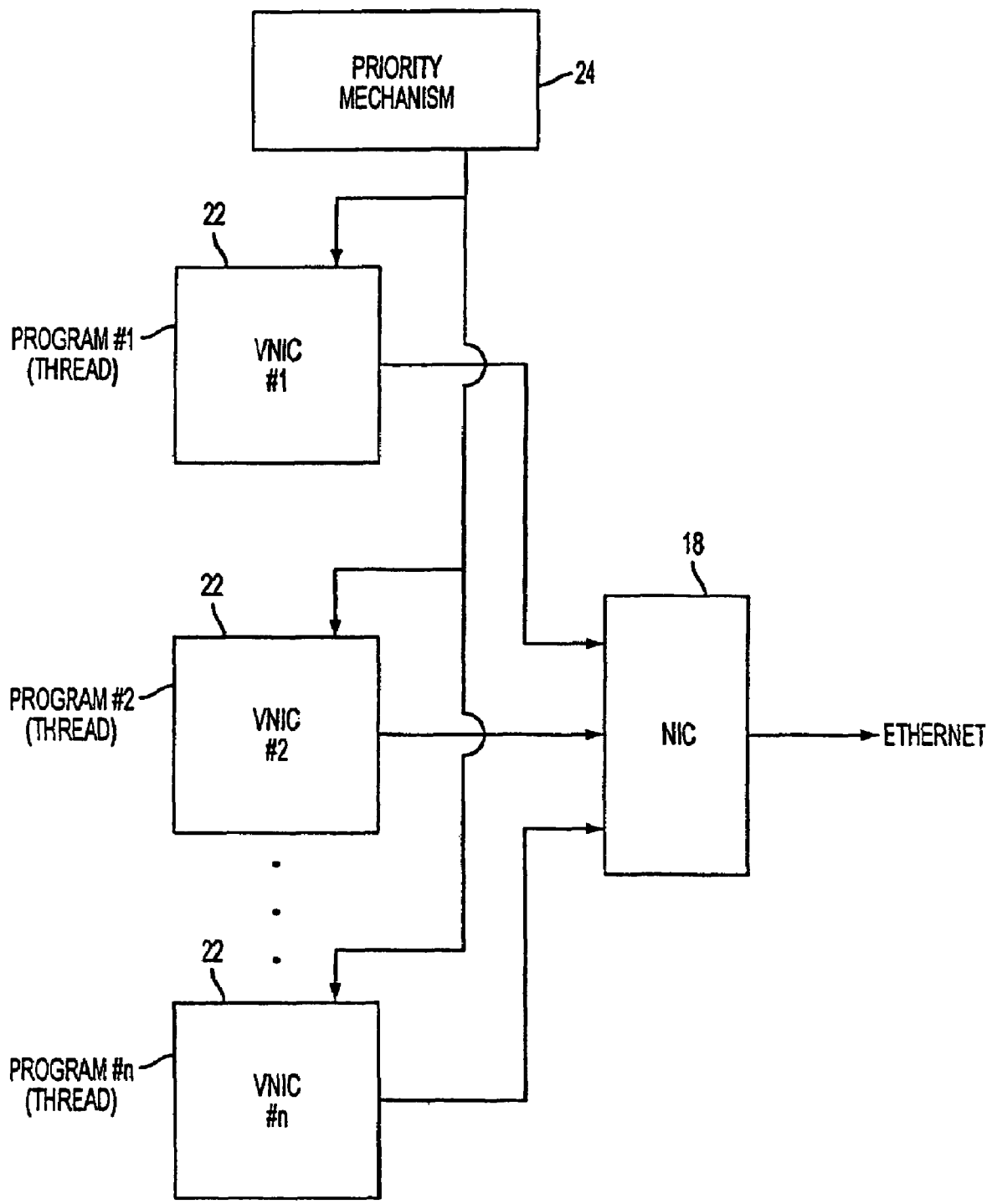
FIG. 2 depicts a priority mechanism for selecting a VNIC to be serviced by a NIC.
Figure 3:
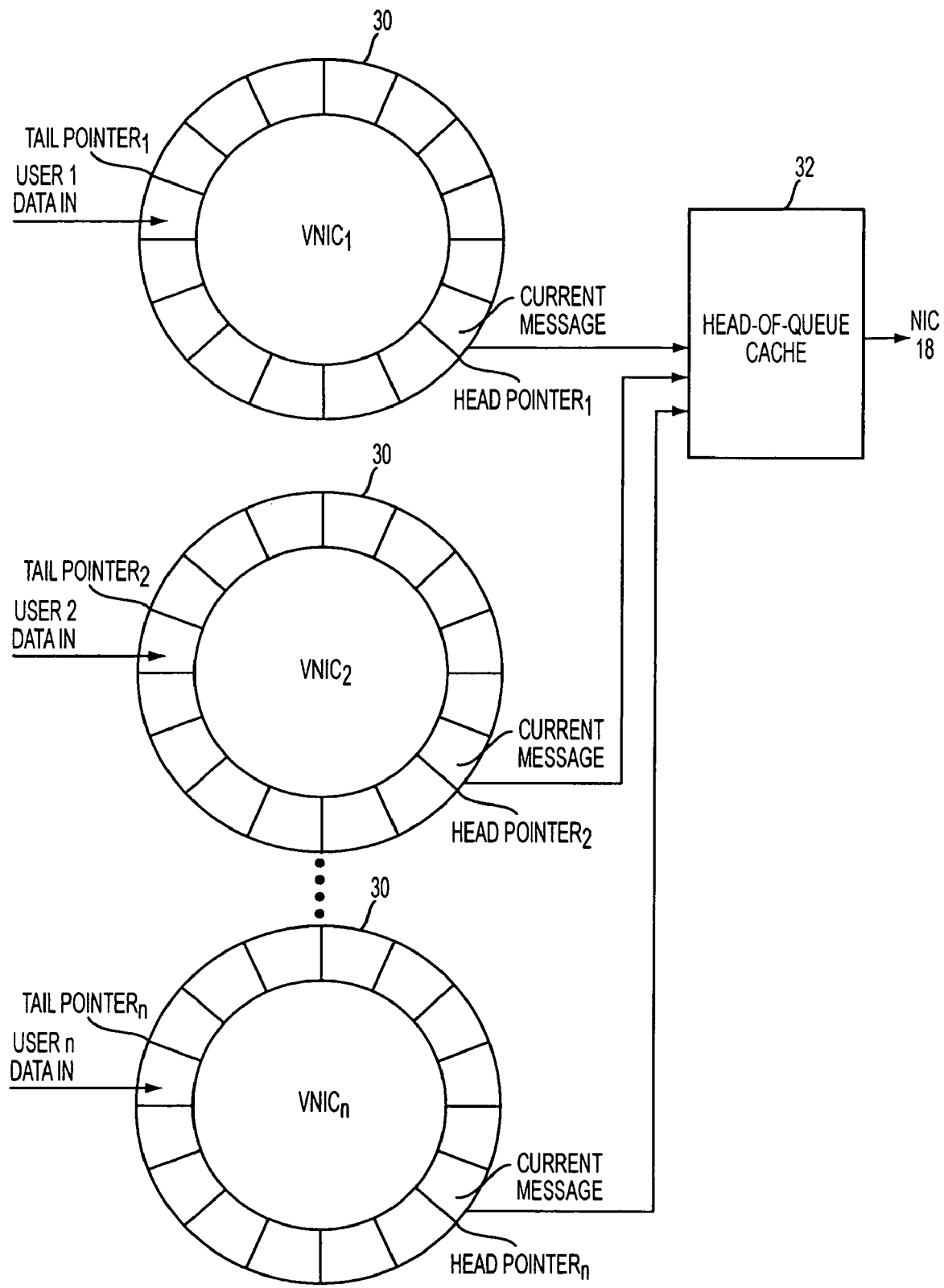
FIG. 3 illustrates a head-of-queue cache mechanism according to an exemplary embodiment of the present invention.

Each of the VNICs 22 illustrated in FIG. 2 can be implemented using circular queues having head and tail pointers as illustrated in FIG. 3. Therein, the circular queues 30 can be implemented using address arithmetic that wraps around a cycle within a bounded range of linear address space. For each circular queue 30, data is inserted at the tail and removed at the head to allow, for example, potential rate mismatch in filling and draining queues 30. Data insertion and removal is accompanied by moving the tail pointer after data is inserted to signal the addition of a message and moving the head pointer after data is removed to signal the deletion of a message. Inspection of head and tail pointers can be used to determine whether a queue is empty and whether the queue has sufficient empty space to hold a new message of a given size. Messages within the circular queues 30 provide an indication of length, which allows for removal of a variable length message followed by precise positioning of the head pointer at the beginning of the next variable length message.

Figure 4:
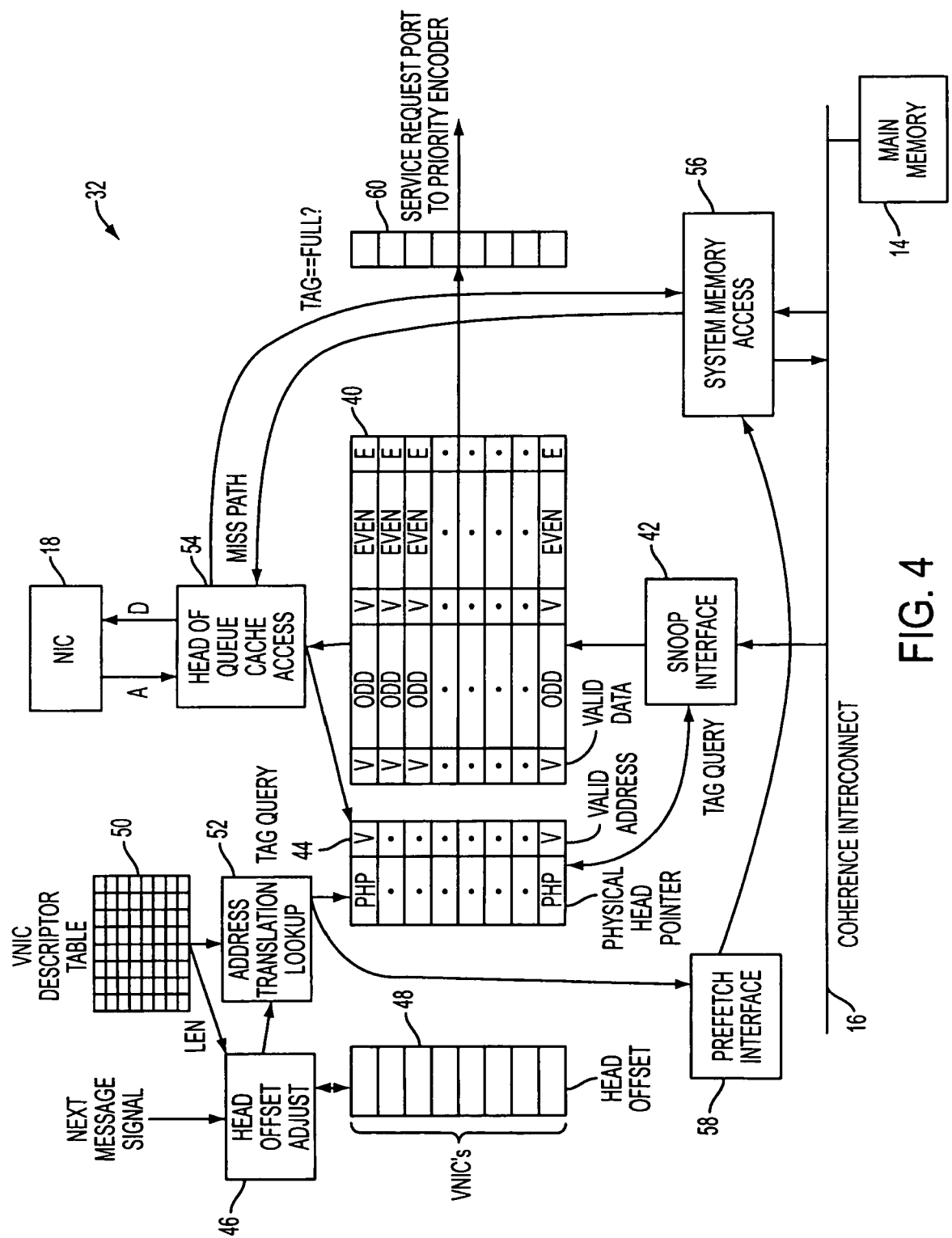
FIG. 4 shows a more detailed example of a head-of-queue cache mechanism according to an exemplary embodiment of the present invention.

To transmit a message, software deposits the message in a queue 30 of a VNIC 22 that is described in a VNIC descriptor table, which is described in more detail below. NIC transmitting hardware should quickly identify and transmit messages that sit at the head of one of the VNIC queues 30 that reside in virtual memory. This process can be accelerated according to the exemplary embodiments of the present invention by using hardware to monitor the coherent interconnect 16 and using information derived from this monitoring process to place messages in a head-of-queue cache 32 for rapid delivery. An exemplary head-of-queue cache system 32 is illustrated in FIG. 4 and described below.

Therein, an exemplary head-of-queue cache memory 40 is illustrated in the center of the figure and has a number of entries (illustrated as rows), each entry in the cache 40 being associated with a different VNIC 22. A number of fields are shown in each entry of the cache 40 including, from left to right, a valid data field (V), an odd cache line field, a second valid data field, an even cache line field and an empty/full tag (E). It will be appreciated that this cache memory architecture is purely exemplary and that other cache configurations can be used to implement head-of-queue cache mechanisms in accordance with the present invention. In this example, the cache 40 can store two lines (even and odd) of data from each VNIC 22's queue 30. This amount of data may, for example, be sufficient to capture short Ethernet messages in their entirety, enabling some requests from NIC 18 to be processed extremely rapidly from the head-of-queue cache 40. However, it will be appreciated that more or fewer cache lines could be provided in cache memory 40 for storage of head end data from each VNIC 22. The valid data tags indicate whether their corresponding odd or even cache lines contain valid representations of the corresponding data resident in memory unit 14, while the empty/full tag indicates whether the tail pointer and the head pointer in the queue 30 associated with that portion of the cache 40 currently have the same value (i.e., whether that VNIC's queue 30 is empty or not).

The rows of the head-of-queue cache 40 are populated and updated by snoop interface 42. According to this exemplary embodiment of the present invention, the head-of-queue cache mechanism 32 uses associative lookup to snoop on the coherence interconnect 16 to determine when data is passed through the coherence interconnect 16 that should be stored in the head-of-queue cache 40. The snoop interface 42 accomplishes this by testing a vector associated with the head pointer (for each VNIC 22) against an address that appears on the coherence interconnect 16. When a memory operation causes data to appear on the coherence interconnect 16 whose address matches the physical head pointer for a valid VNIC 22, the snoop interface can copy that data into the corresponding head-of-queue cache entry for that VNIC 22. The match can be performed by the snoop interface 42 in such a way that, for a given queue head, both even and odd cache lines match. This enables acquisition of both the cache line at the head of a queue 30 and the next cache line from that queue 30 (which, if not part of the same message as the cache line at the head of the queue, will become the head of the queue immediately after service is provided to that VNIC 22 and is a likely candidate for rapid retrieval).

To better understand one way in which snoop interface 42 can operate in accordance with the present invention consider the following example. Assume a head-of-queue cache 40 that stores lines of size LS bytes. Let function $C(x)$ compute the beginning address of the cache line that holds any address x, in this example an address pointed to by physical head pointers (PHPs). If a cache line consisted of LS=32 bytes that are aligned on 32-byte boundaries, then $C(x)$ is computed by ignoring (masking to 0) 5 low order bits of the address x. Further assume that this exemplary head-of-queue cache 40 can hold NC physically consecutive cache lines (two in the example above) at the head of each VNIC 22. The head of queue cache 40, for the ith VNIC 22, can hold a window of NC cache lines with starting addresses $C(PHP_i)$, $C(PHP_i)+1*LS$, $C(PHP_i)+2*LS$, ... $C(PHP_i)+(NC-1)*LS$.

Snooping interface 42 causes cache line data that is written to memory at an address that lies within a valid VNIC window to be stored in the head-of-queue cache 40. In this purely illustrative example, address x lies within the window of the ith VNIC 22, if $(C(PHP_i)<=C(x)<C(PHP_i)+NC*LS)$. When a cache line store is seen on the coherence interconnect 16, that cache line is deposited within the head-of-queue cache 40 if it is within a VNIC window. The cache line is stored in the head-of-queue cache column specified by $(x/LS)$ MOD $(NC)$. In this example, if cache lines are numbered consecutively starting at 0, even cache lines are stored in the even column while odd cache lines are stored in the odd column. When a cache line is stored within the head-of-queue cache 40, the valid bit is set for that line.

Then, e.g., when data is sent to the network by the NIC 18, the NIC 18 requests that data by reading data at address x. The data is retrieved from the head-of-queue cache 40 if it resides in the cache otherwise it is retrieved from memory. Read data lies within the head-of-queue cache window for VNIC i if $(C(PHP_i)<=C(x)<C(PHP_i)+NC*LS)$. When read data lies within the head-of-queue cache window, the valid bit for the cache line in column $(x/LS)$ MOD $(NC)$ is tested. If the cache line is valid, the data is returned from the selected cache column rather than from memory.

The snoop interface 42 is provided with the physical head pointer addresses from physical head pointer table 44, which includes a physical head pointer (PHP) and valid address tag (V) associated with each VNIC 22. The valid address tag (V) indicates whether the corresponding VNIC 22 is valid and has a correctly calculated head pointer address or is invalid and should not be considered. Since the physical head pointers associated with each VNIC 22 vary over time, elements 46-52 operate to keep the physical head pointer table 44 updated with appropriate values.

According to exemplary embodiments of the present invention, the head-of-queue for each VNIC 22 is initially represented as an integer head offset into each VNIC's queue 30, which offsets are stored in table 48. For example, if a queue 30 has 1024 message slots, then that queue 30's head offset could be 1000. When a message is added to that particular queue 30, the head offset adjust function 46 retrieves the length of that queue from the VNIC descriptor table 50, the current head offset for that queue from table 48 and performs circular arithmetic using those values, and the length of the message added to the queue, to determine a new head offset that corresponds to the location of the oldest message in that queue 30 for that particular VNIC 22. The new head offset is stored in the corresponding entry in table 48 and is passed to address translation lookup function 52.

Address lookup function 52 retrieves the virtual address range associated with the VNIC 22's queue 30 whose head offset has changed from the VNIC descriptor table 50 and translates the combination of the virtual address range and the new head offset into a new physical head pointer address. The new physical head pointer address is then stored in the entry of table 44 which corresponds to the VNIC 22 whose head pointer address is being updated. More specifically, and according to the exemplary embodiment of FIG. 4, the cache memory 40 holds two cache lines of data from the head of each VNIC's queue 30 and the VNIC head offsets stored in table 48 are aligned to begin on an even cache line. Thus these exemplary head offsets for each VNIC 22 can be subdivided into two indices: a page offset within the VNIC 22's virtual address range and a cache line offset within that page. Then, to translate the combination of the virtual address range and the new head offset, the address translation lookup function 52 can use the page offset to select the correct page within that VNIC 22's physical page vector and the cache line offset is added to the address of the selected page.

Having described how the head-of-queue cache 40 can be organized and updated according to an exemplary embodiment of the present invention, the following describes how it can be used to facilitate message transmission in accordance with an exemplary embodiment of the present invention. When the NIC 18 sends an address (A) as part of a request for data (e.g., a command residing in the queue of a VNIC 22 that has been selected for service) to the head-of-queue cache access unit 54, the head-of-queue cache device 32 first checks to see if a valid version of the requested data is resident in the cache memory 40. This can be accomplished by, for example, the head-of-queue cache access unit 54 checking the received addresses against those stored in the physical head pointer table 44 and performing a tag query of the cache memory 40. If the request results in a cache hit, then the cache memory 40 forwards the requested data to the head-of-queue cache access unit 54.

Alternatively, if the requested data is beyond the two (in this example) cache lines stored in the cache memory 40 or if the stored cache data lines are invalid, a cache miss occurs. Then the head-of-cache queue unit 54 signals the system memory access function 56 to request the data for NIC 18 from the main memory 14 ("miss path"). The data is returned to the head-of-queue cache access unit 54 and sent to the NIC 18.

After the data from a VNIC 22 is processed (e.g. transmitted on a network), its physical head pointer is moved across the processed data. The motion of the head pointer signals the need to begin processing data at the new queue head. After data in the ith VNIC 22 is processed, $PHP_i$ is adjusted from its old value $old\_PHP_i$ to its new value $new\_PHP_i$. If the head pointer is moved a modest distance, some of the data in the head-of-queue cache 40 remains valid. This is accomplished by retaining valid cache lines that were in both the old, as well as the new, cache window. Each time the PHP is adjusted, any cache lines that were in the old windows but not in the new are invalidated. This calculation can be performed as described by the pseudocode below:

```
phpa = (old_PHP_i / LS)
phpb = (new_PHP_i / LS)
diff = phpb−phpa /* number of lines moved*/
ovf = ~ (0 <= diff < L) /* overflow if moved more than L lines */
ma = phpa MOD NC /* cache column corresponding to phpa */
mb = phpb MOD NC /* cache column corresponding to phpb */
s = ( (mb−ma) >= 0 ) ) /* 1 if b >= a */
for (i=0, ... , L−1) va_i = i >= ma /* true at or to the right of the phpa column */
for (i=0, ... , L−1) vb_i = i   < mb /* true to the left of the phpb column */
inv = ~ovf & ( s&(vb&va) | ~s & (vb|va) ) | (ovf & 1)
/* identify columns for data that was in the old window but not in the new window */
v= v & (~ inv) /* mask to zero valid bits that are known as invalid */
```

The invalidate vector computed above identifies head-of-queue columns that are invalidated when the head pointer is moved. Each of these columns was a member of the previous window and may have data which is no longer a member of the new cache window and is therefore now considered as invalid. After the PHP pointer is updated, and the new valid vector is computed, snooping resumes as described above.

According to one exemplary embodiment of the present invention, a prefetch interface 58 can also be included as part of the head-of-queue cache mechanism 32. Prefetch interface 58 receives updated physical head pointers from the address translation lookup function 52 and operates to proactively prefetch data for the cache memory 40. For example, after the NIC 18 transmits a message at the head of a queue 30 across the system, the NIC 18 sends a suitable indicator to the head offset adjust function 46 to update that VNIC 22's corresponding head offset and physical head pointer. When this occurs, the data entry within the cache 40 which is associated with this particular VNIC 22 is temporarily invalid as it has not yet been updated to reflect the message associated with the new head pointer. Accordingly, the prefetch interface 58 can use the updated physical head pointer to request retrieval of the data located at that address (via system memory access unit 56) in main memory 16. This data can then be stored in the corresponding entry of cache 40 so that it is valid and available when requested by NIC 18.

Having described an exemplary head-of-cache queue implementation according to an exemplary embodiment of the present invention, some applications of this exemplary hardware circuitry will now be discussed. For example, another feature of exemplary embodiments of the present invention is the use of special messages (referred to herein as "nil") messages which are added to queues 30 by users (software) after the tail of each VNIC's queue 30 to enable determinations to be made regarding whether each queue 30 is empty or non-empty (full). Consider, for example, an empty VNIC having head and tail offsets which are equal, thereby indicating that there are no meaningful entries in the circular queue 30. Whenever an empty VNIC's head message is loaded into the head-of-queue cache 40, the full/empty tag E portion of the cache 40 provides an indication that this VNIC 22 has no messages that need transmit service. Comparator circuitry 60 evaluates the full/empty tags E to determine whether each cache entry is either full or empty. The comparator circuitry 60 can then produce a service request bit vector that identifies all non-empty VNICs 22, which is sent to a priority encoder (not shown) where the service request bit vector can be used to quickly identify a next VNIC 22 that needs service from NIC 18.

As mentioned above, users (e.g., software applications) transmit a message into a VNIC queue 30 by writing a new message to memory at the tail of the queue. These new messages can be followed by a terminating nil message to mark the end of valid data. The terminating nil message should be updated as new messages are added to the queue in a manner which avoids situations where the terminating end marker is marked non-nil and the network interface reads beyond the prior end marker. Consider, for example, the following scenario. When adding a new message to VNIC queue 30, the terminating end marker is first removed, then the new data is added at the VNIC tail, and next the terminating end marker is placed after the newly added data. If this approach is used, there is a brief period of time when the VNIC is not properly terminated and NIC hardware may read erroneous data. To ensure that all data up to the terminating end marker is always valid, a newly appended message with a new end marker is written in a specific order so that the last field modified is the prior end marker. First data is written after the prior end marker while leaving the prior end marker intact. Then a new end marker is written after the newly deposited data and finally, the prior end marker is overwritten allowing access to the new message. When this prior end marker changes value from nil to non-nil, hardware processing advances across the newly appended valid message until the new end marker is reached.

Whenever the head of a valid VNIC 22 is positioned on a nil message, the transmitting NIC 18 awaits new data. In this case, when software appends a new message at the tail and updates the prior terminating nil message, the transmitting NIC 18 can detect the arrival of new data using snoop interface 42. If software ensures that the change to the data at the VNIC head is transferred to the coherent interconnect 16 (e.g., by issuing a cache flush operation), then the transmitting NIC 18 will observe this operation and update the value at the head of the queue 30. This causes a corresponding change of value for the empty/full tag E and, in turn, signals a service request for the now non-empty VNIC 22.

Figure 5:
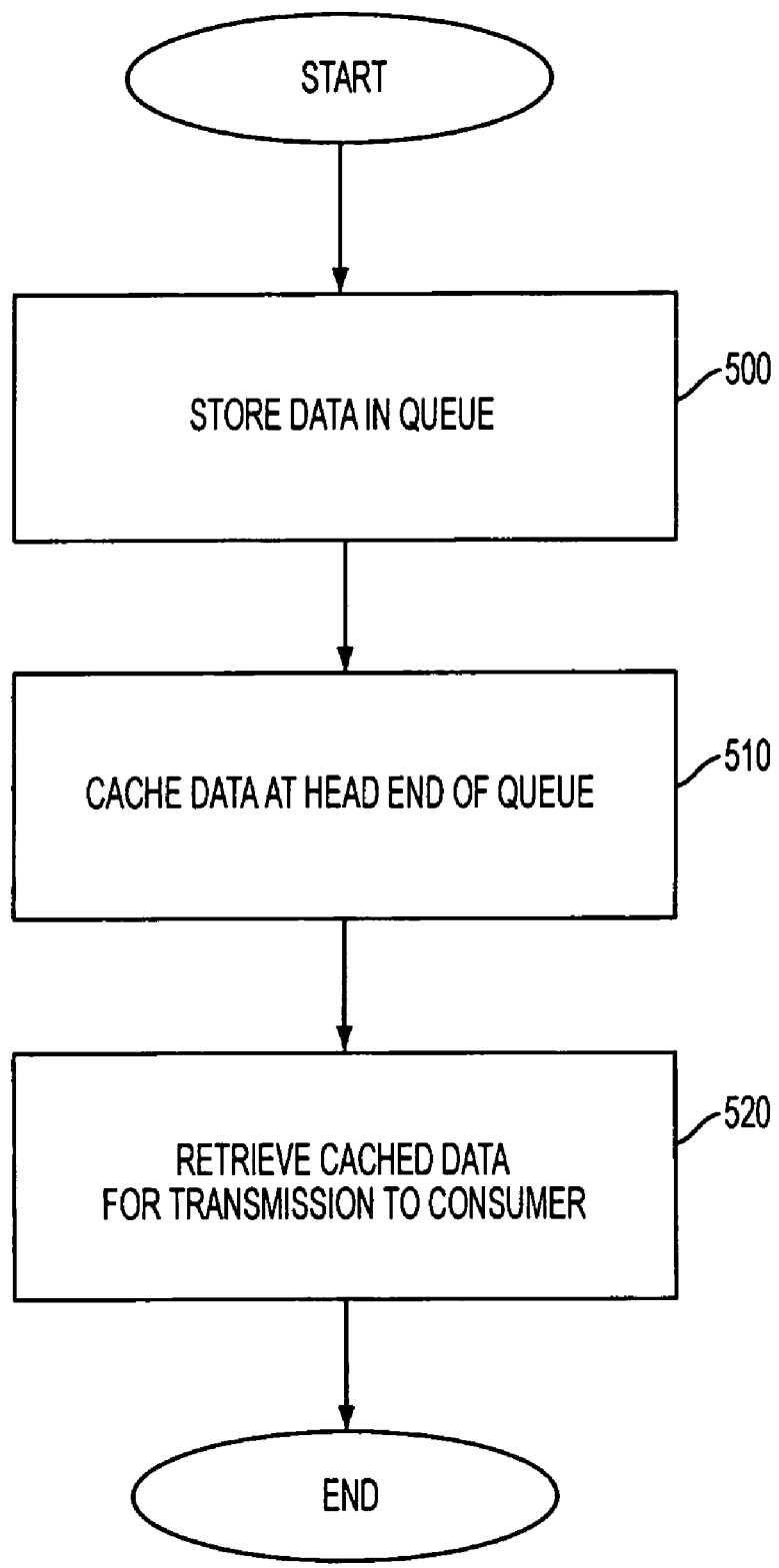
FIG. 5 is a flow chart depicting a method for communicating data according to an exemplary embodiment of the present invention.

Based on the foregoing, an exemplary method for communicating data from a producer (e.g., a VNIC) to a consumer (e.g., a NIC) is illustrated in the flowchart of FIG. 5. Therein, data is stored in a queue at step 500, at least some of that data, from the head end of the queue, is cached at step 510 and that cached data is then retrieved from the cache for transmission to the consumer for transmission at step 520. In exemplary embodiments of the present invention including VNICs and NICs, this technique facilitates presentation of message data to the NIC 18 after selection of a VNIC 22 for service, thereby reducing latency associated with data communications across the network.

However, those skilled in the art will appreciate that head-of-queue caches according to exemplary embodiments of the present invention can be used for purposes other than networking. Whenever data is exchanged in a memory-based queue from a producing procedure implemented in either hardware or software, to a consuming procedure implemented in either hardware or software, a head-of-queue cache may be used to streamline access to that data. A non-networking example use of the head-of-queue cache would be a graphics display list generator that generates a display list and a display-list rendering engine that renders that display list on a video screen. Both the generator and the rendering engine might be implemented in either software or hardware. A head of queue cache can be used to interface the producer (e.g., the display list generator) to the consumer (e.g., the graphics rendering engine).

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A method comprising:
   identifying an address of a head end of a queue;
   monitoring a coherent interconnect to identify a data transfer communicated by a producer which targets the address;
   storing data of the data transfer in the queue;
   based at least in part on whether the monitoring identifies the address, selectively storing at least a portion of the data in a head-of-queue cache memory; and
   selectively retrieving said at least a portion of the data from the head-of-queue cache memory instead of from the queue for transmission to a consumer.

2. The method of claim 1, wherein said queue is a circular queue having a head pointer, which points to the location of an oldest message in said queue, and a tail pointer, which points to a newest message in said queue.

3. The method of claim 2, further comprising:
   maintaining a table that stores the address; and
   using the table to identify the data transfer that targets the head end of queue address.

4. The method of claim 3, wherein the act of using the table comprises:
   snooping on the coherent interconnect to identify the data transfer that targets the address.

5. The method of claim 1, wherein said producer and said consumer are one of a virtual network interface circuit (VNIC) and a network interface controller (NIC).

6. The method of claim 5, wherein said head-of-queue cache memory has an entry for each of a plurality of VNICs.

7. The method of claim 1, wherein the act of storing said at least a portion of the data in the head-of-queue cache memory comprises:
   prefetching said at least a portion of the data based on an updated head pointer.

8. The method of claim 1, wherein the act of retrieving said data from said head-of-queue cache memory for transmission to said consumer further comprises:
   determining if a message requested by said producer for transmission is present as part of said cached data;
   if so, providing said cached data to a transmitter associated with said producer; and
   otherwise, requesting said message from a main memory.

9. The method of claim 1, wherein said producer comprises a graphics display list generator that generates a display list and said consumer comprises a display-list rendering engine.

10. The method of claim 1, wherein the act of storing the data comprises the step of:
    adding a terminating message at a tail of said queue.

11. The method of claim 10, wherein the act of adding a terminating message at a tail of said queue comprises:
    writing new data to said queue after a previously stored terminating message;
    adding said terminating message after said new data; and
    overwriting said previously stored terminating message to allow access to said new data.

12. A system for communicating data comprising:
a first device which is a producer of data;
a second device which is a consumer of said data;
a queue to store said data to be transmitted from said producer to said consumer, the queue having a head end of queue address;
a head-of-queue cache memory; and
a controller to monitor data transfers over a coherent interconnect to identify a data transfer that targets the head end of queue address and selectively store at least a portion of data from the identified data transfer in the head-of-queue cache memory.

13. The system of claim 12, wherein said queue is a circular queue having a head pointer, which points to the location of an oldest message in said queue, and a tail pointer, which points to a newest message in said queue.

14. The system of claim 13, further comprising:
a table to store an indication of the head end of queue address; and
a subsystem to maintain updates of the indication.

15. The system of claim 14, wherein the controller comprises:
a snoop interface to monitor the coherent interconnect to identify the data transfer that targets the head end of queue address.

16. The system of claim 14, further comprising:
a head offset table for tracking changes to head pointer locations as messages are added to or removed from said queue; and
an address translation lookup function for translating said changes into new physical head pointer addresses and updating said physical head pointer table.

17. The system of claim 12, wherein said first device comprises a network interface controller (NIC) that presents a message address to a cache interface unit which either retrieves data associated with said message address from said head-of-queue cache or retrieves said data from a main memory unit via said coherent interconnect.

18. The system of claim 12, wherein said first device comprises a graphics display list generator that generates a display list and said consumer device is a display-list rendering engine.

19. The system of claim 12, wherein said data stored in said queue includes a terminating message at a tail of said queue.

20. A system for communicating data between a producer and a consumer comprising:
means for identifying an address of a head end of a queue;
means for monitoring a coherent interconnect to identify a data transfer communicated by a producer which targets the address;
means for storing data of the data transfer in the queue;
means for selectively storing at least a portion of the data in a head-of-queue cache memory based at least in part on whether the monitoring identifies the head end of queue address; and
means for selectively retrieving said at least a portion of the data from the head-of-queue cache memory instead of from the queue for transmission to a consumer.

* * * * *